US006819353B2

(12) United States Patent
Heyden

(10) Patent No.: US 6,819,353 B2
(45) Date of Patent: Nov. 16, 2004

(54) MULTIPLE BACKGROUNDS

(75) Inventor: Anders Heyden, Dalby (SE)

(73) Assignee: WESPOT AB, Lund (SE)

( * ) Notice: Subject to any disclaimer, the term of this patent is extended or adjusted under 35 U.S.C. 154(b) by 730 days.

(21) Appl. No.: 09/746,511

(22) Filed: Dec. 22, 2000

(65) Prior Publication Data

US 2002/0039135 A1 Apr. 4, 2002

Related U.S. Application Data

(60) Provisional application No. 60/177,305, filed on Jan. 21, 2000, and provisional application No. 60/177,308, filed on Jan. 21, 2000.

(30) Foreign Application Priority Data

Dec. 23, 1999 (SE) .............................................. 9904741
Dec. 23, 1999 (SE) .............................................. 9904742

(51) Int. Cl.[7] .................................................. H04N 7/18
(52) U.S. Cl. ..................................................... 348/143
(58) Field of Search ................................. 348/143, 152, 348/153, 154, 155, 156; 340/541

(56) References Cited

U.S. PATENT DOCUMENTS

| | | | | |
|---|---|---|---|---|
| 3,732,366 | A | * | 5/1973 | Bolie ........................... 382/218 |
| 5,467,402 | A | * | 11/1995 | Okuyama et al. ........... 382/104 |
| 5,467,403 | A | * | 11/1995 | Fishbine et al. ............ 382/116 |
| 5,555,512 | A | | 9/1996 | Imai et al. |
| 5,666,157 | A | | 9/1997 | Aviv |
| 5,847,755 | A | | 12/1998 | Wixson et al. |
| 5,963,272 | A | | 10/1999 | Wixson |
| 6,104,831 | A | * | 8/2000 | Ruland ........................ 382/173 |
| 6,298,144 | B1 | * | 10/2001 | Pucker et al. ............... 382/103 |
| 6,424,370 | B1 | * | 7/2002 | Courtney .................... 348/143 |
| 6,434,254 | B1 | * | 8/2002 | Wixson ....................... 382/103 |
| 6,546,115 | B1 | * | 4/2003 | Ito et al. ..................... 382/100 |
| 6,549,669 | B1 | * | 4/2003 | Sundqvist et al. .......... 382/238 |

FOREIGN PATENT DOCUMENTS

| | | |
|---|---|---|
| EP | 0090395 | 10/1983 |
| EP | 0445334 | 9/1991 |
| EP | 0805425 | 11/1997 |
| EP | 0986036 | 3/2000 |
| GB | 2282294 | 3/1995 |
| WO | WO 9828706 | 7/1998 |

OTHER PUBLICATIONS

Gian Luca Forest, *Object Recognition and Tracking for Remote Video Surveillance*, IEEE Transactions on Circuits and Systems for Video Technology, vol. 9, No. 7, Oct. 1999, pp. 1045 through 1062.

Michael Meyer, et al., *A New System for Video–Based Detection of Moving Objects and its Integration into Digital Networks*, Security Technology, 1996, 30th Annual 1996 International Carnahan Conference, pp. 105 through 110.

Elena Stringa, et al., *Content–based Retrieval and Real Time Detection from Video Sequences Acquired by Surveillance Systems*, 1998 IEEE, pp. 138 through 142.

Abstract of Japanese Patent Publication No. 06–223190, Patent Abstracts of Japan (Aug. 12, 1994).

Abstract of Japanese Patent Publication No. 09–050525, Patent Abstracts of Japan (Feb. 18, 1997).

* cited by examiner

*Primary Examiner*—Chris Kelley
*Assistant Examiner*—George A Bugg
(74) *Attorney, Agent, or Firm*—Birch, Stewart, Kolasch & Birch, LLP

(57) ABSTRACT

A method for monitoring a monitored area comprising the steps of recording an image of the monitored area and of comparing the recorded image with a reference image in order to determine whether there is an alarm situation. The method further comprises the step of creating the reference image by combining at least two previously stored images from a set of images, so that the lighting conditions in the reference image are adjusted to the lighting conditions in the recorded image.

16 Claims, 3 Drawing Sheets

MULTIPLE BACKGROUNDS

CROSS REFERENCE TO RELATED APPLICATION

This application claims the benefit of U.S. Provisional Application No. 60/177,305, filed Jan. 21, 2000 and U.S. Provisional Application No. 60/177,308, filed Jan. 21, 2000.

TECHNICAL FIELD

The present invention relates to a method for monitoring a monitored area, comprising the steps of recording an image of the monitored area and of comparing the recorded image with a reference image in order to determine if there is an alarm situation. The invention further relates to a monitoring unit and a computer program.

TECHNICAL BACKGROUND

The use of cameras for various types of monitoring, both in industry and in private dwellings, is already known. The aim of the monitoring is often to prevent burglary and theft.

The camera takes pictures of a monitored area. The monitored area is limited by the optics of the camera. The recorded images are analyzed for an evaluation of their content to be made. If the camera monitors, for example, premises in which people are not permitted, an analysis is made of the recorded image and an evaluation made whether there is an extraneous object within the monitored area or not.

In a monitoring context the term scene is used. The scene changes, for example, is something moves physically within the monitored area, for example if a person enters the monitored area. On the other hand, the scene does not change if the light in the monitored area changes. If a change of scene is detected, it can be determined that there is an alarm situation.

The analysis of the recorded images can be carried out manually, by a person looking at a recorded image and making a visual evaluation about whether there is an intruder in the monitored area or not. If an intruder is discovered on a recorded image, the monitoring personnel who carries out the evaluation can, for example, telephone the police for further measures to be taken. This is an expensive form of monitoring, as it requires a person to go through the recorded images. Even if the person who carries out the evaluation of the recorded images can evaluate and monitor several monitored areas at the same time, it is time-consuming and very monotonous and stressful work, as an "event" that is not permitted must not be missed in the recorded images. In addition to an intruder entering a building, an event that is not permitted can be an incorrectly manufactured bottle in a production line.

The analysis of the recorded images is therefore carried out to an increasing extent by means of digital image processing. In order to discover, for example, an intruder in a recorded image, the recorded image is compared with a reference image, which can be a background image that was recorded on a previous occasion when there was no intruder in the monitored area. The reference image can also be the immediately preceding recorded image. If there is a difference between the two compared images this can mean that there is an intruder in the monitored area. The difference can also be due to changes in the light in the monitored area, which for instance can arise when the sun goes behind a cloud, when it starts to get dark or when a light is switched on. One way of reducing the problem caused by changes in the light is to detect which changes concern changes in the light and which concern changes in the scene. This is solved by using different criteria for which changes in intensity are the result of changes in the light and which are the result of changes in the scene. This is a difficult problem to solve. The algorithms that are used are very complicated and take a long time to process.

Another problem of the prior-art technique is if changes in the light give rise to changes in intensity that do not follow the said criteria for changes in intensity. This occurs, for example, when there are objects in the scene that cast shadows. In this case, the changes in the light will be one way in the shadow and another way alongside.

SUMMARY OF THE INVENTION

An object of the present invention is therefore to provide a method that avoids the above-mentioned problems.

This object and other objects which will be apparent from the following description are achieved, according to a first aspect of the present invention, by a method, which is of the type described by way of introduction and is characterized by the step of creating the reference image by combining at least two previously stored images of a set of images, so that the lighting conditions in the reference image is adjusted to the lighting conditions in the recorded image.

Instead of first comparing the recorded image and the reference image to determine whether the image has changed and then deciding whether the change is an alarm situation or a change in the light, the changes in the light are now considered before the comparison is made. This is carried out by having previously stored images which can be combined and in this way can recreate the lighting conditions in the reference image. A new reference image can be created before each comparison with a recorded image. It is also possible to use the preceding reference image when the next image of the monitored area is recorded and is to be compared with a reference image. For example, a new reference image can be recreated every couple of minutes, or every fifth, tenth or hundredth time an image is recorded and is to be compared with a reference image. An advantage of the present invention is that an optimal reference image is obtained in a simple and quick way, which reference image takes the lighting conditions into account. This means that the step of comparing the recorded image and the reference image becomes simpler and requires less complex algorithms than must be used, for example, for the classification of areas according to changes in the light and changes in the scene. This also has the advantage that less memory is required. This is particularly important when there is limited processing capacity, which is the case in a system with distributed intelligence. Distributed intelligence means that an analysis of the recorded image is carried out in a monitoring unit at the monitored area to determine whether there is an alarm situation.

The result of the comparison is also more reliable as the risk of a false detection is reduced when a reference image according to the invention is used.

The monitoring can, for example, be carried out in premises where valuable documents are stored and in which people are not permitted, and aims at detecting whether a person is in the room or not. In order to be able to detect a person, an image is recorded and the area which the image covers is called the monitored area. The recorded image is compared with a reference image in order to discover whether a person has entered the monitored area. The reference image is an image that represents the background of the monitored area at the time of recording the image. The background of the monitored area can be declared as the monitored area when no object that can cause an alarm is in the monitored area, that is to say when the monitored area is undisturbed. The reference image is created by combining images which are stored in a set of images, so that the reference image is adjusted to the prevalent lighting conditions in the recorded image. The image information in the reference image is adjusted to the image information in the recorded image. The image information comprises the light intensity in the pixels of the image. The images in the set of images do not need to correspond individually to an actual light level for the scene. What is important is that it is possible to create a reference image for as many different types of light level as possible from a limited number of images. It can be possible to update the set of images when the lighting conditions in the recorded image cannot be recreated in the reference image from the set of images.

By combining images in a set of images, it is also possible to take into account shadows from fixed objects, which shadows are included in the reference image.

Another advantage is that the monitoring system is more robust and less sensitive to interference when the reference image is adjusted immediately to the prevalent lighting conditions and does not detect these separately afterwards.

In another preferred embodiment, the reference image is created by linear combination of said at least two images.

Linear combination means that a coefficient is calculated for each image in the set of images and the linear combination is created based on the calculated coefficients.

In order to adjust the reference image to the recorded image as well as possible, it is possible to use an algorithm that attempts to find the linear combination of the images in the set of images that conforms as well as possible to the light level in the recorded image.

In a further preferred embodiment, the method further comprises in addition the steps of calculating a difference image as the difference between the reference image and the recorded image, determining at least one divergence area in the difference image in which at least certain pixels exceed a particular level, determining whether the divergence area represents a scene change and, if the divergence area represents a scene change, taking out the pixels that correspond to the divergence area in the recorded image, for the creation of the next reference image, or in the reference image, before comparison with the recorded image.

The difference image can be derived as the difference in intensity between each pixel in the recorded image with each corresponding pixel in the reference image. By means of the difference image, it is possible to see whether, and if so where, there is a difference between the recorded image and the reference image. These differences can be apparent as a divergence area, which can be a number of pixels that exceed a predetermined threshold value and which are adjacent to each other. The number of divergence areas can be none, one or more. These divergence areas can be caused by scene changes, but they can also be caused, for example, by changes in the light. In order for an area in the difference image to be called a divergence area, there can be various criteria that have to be fulfilled. Examples of such criteria can be that the area must be of a certain size, that is it must occupy at least a predetermined number of pixels and/or that the intensity difference in a pixel in the recorded image and the reference image must exceed a particular level. Other criteria can, for example, be the shape of the area, that is to say how the pixels that exceed the threshold value abut each other.

If the divergence area is due to a scene change, this scene change will most probably be repeated in the next recorded image. In order to create as good a reference image as possible for this next recorded image, pixels corresponding to those that the divergence area occupies in the difference area are removed from the recorded image. The divergence area advantageously also comprises pixels that abut the pixels that fulfil one or more criteria for constituting a divergence area. By also removing these pixels, it is taken into account that the scene change may have moved in the monitored area before the recording of the next image. In this way, an even better reference image is obtained. How much the divergence area is enlarged can depend, for example, on how quickly it is expected that detected scene changes can move in the monitored area.

The removed pixels are given a light level that is dependent upon the light level of the other pixels and an estimate of the lighting conditions in the area occupied by the scene change is obtained.

An advantage of this method is that the reference image is created based on the prevalent lighting conditions without interference from scene changes.

A further advantage of this method is that a better reference image is obtained and that it is thus easier to detect objects in the recorded image.

Another advantage is that also less advanced algorithms are required, which in turn means that the calculation requires less processing capacity and less memory.

In one embodiment according to the invention, the method comprises the steps of determining whether the divergence area represents a change in the light and of updating the set of images if the divergence area represents a change in the light.

If the divergence area represents a change in the light, the light level in the recorded image could not be recreated from the set of images. New lighting conditions have been detected and the set of images is updated with these new lighting conditions. If the image differs significantly from the previous set of images, the base must be increased by a new image, but advantageously not with precisely the recorded image. Instead, what is important is that the new lighting conditions can be recreated with the set of images. The new set of images can be derived by using the recorded image plus the original set of images and performing a single value division (SVD). There are also other algorithms that can be used in this connection, such as the Grahm-Schmidt algorithm. If the base is orthogonal and the set of images is to be updated with a new image that corresponds to new lighting conditions, it is not sufficient simply to add the recorded image, as we wish to retain the orthogonal base. What is important is instead to be able to recreate the new lighting conditions with the new base. Using, for example, SVD it is possible to synthesize an image which is orthogonal to the others in the set of images.

According to a further preferred embodiment, the method comprises the step of updating the set of images if the divergence area represents a scene change and if the same scene change is detected in a predetermined number of successively recorded images.

Such a scene change is a persistent change and can, for example, be a flower-pot that has fallen on the floor. These persistent changes can be said to be non-critical changes of the scene. The number of images that is required in order to determine whether a persistent scene change has occurred is a matter of judgement. The number of images can also be measured in time as images can be recorded at predetermined intervals. It must not be the case that a burglar can be designated as a persistent scene change simply because he moves very slowly. For example, if a camera takes 10 images per second and a persistent scene change is defined as a change which lasts for one minute (or for three minutes) the number of images is 600. The updating can be carried out in such a way that a new set of images is created by discarding the old base and letting the most recently recorded image form a new set of images, which initially consists of only this one image.

The scene change can also be incorporated gradually, whereas updating for a new light level should be carried out more rapidly.

An advantage of this method is that a more correct reference image can be created.

In a preferred embodiment the step of determining whether the divergence area represents a scene change comprises calculating the variance of the divergence area, and if the variance exceeds a predetermined value it is determined that the divergence area represents a scene change.

The variance of a divergence area in the difference image is calculated. If the variance is large, it is a scene change. If the variance is small, the divergence area can, for example, be judged to be due to a change in the lighting. An advantage of using the variance to determine which type of change has occurred is that it is a simple method.

In another embodiment, at least the outermost edge of pixels in the recorded image is omitted when creating the reference image.

It is an advantage not to include the outermost edge or edges of pixels when calculating the reference image, as, for example, an intruder will appear first at the edge of the image. This interference will then not be included in the creation of the reference image and therefore will not affect the reference image.

In a preferred embodiment, the stored images are stored in a set of images at different resolutions.

An advantage of this is that it saves memory capacity, which is normally limited in a monitoring system. It is normally sufficient to store one or a few images at full resolution and the others at a considerably lower resolution.

In an embodiment according to the invention, the step of creating the set of images further comprises recording images of the monitored area in different lighting conditions and storing one or more of these recorded images.

When the monitoring system is put into operation, a very large set of light levels can be stored in the set of images. One way of creating such a set of images is to take a sequence of images when starting up the system. This sequence of images can be taken over a predetermined period of time. During this time the light level varies as much as possible. An advantage of using such a set of images is that when there is a difference between the recorded image and the reference image, it can be determined straight away whether the difference is a scene change. A further advantage of this way of creating the set of images is that the derivation of a reference image from the set of images is quick and easy to carry out. It can also be possible to update this type of set of images if new lighting conditions arise.

In one embodiment, the step of updating the set of images is carried out at predetermined intervals.

The whole set of images can advantageously be updated over time in order to prevent the set of images from becoming too large. That is to say that the set of images is updated so that it does not include lighting conditions that are not relevant. A time factor determines how long a time it is to take for the change to be incorporated in the base. For example, the updating can be carried out once an hour.

In a preferred embodiment of the invention, said at least two images in the set of images are stored orthogonally.

Storing images orthogonally means that the scalar product of each matrix that represents an image with itself is equal to one and that its scalar product with every other matrix that represents an image is equal to zero.

An advantage of storing the set of images as an orthogonal base is that a large number of light variations can be captured in a limited number of images. For example, the continuum of light variations produced by a dimmer can be captured with only two base images.

Another advantage of using an orthogonal base is that it is simpler and quicker to derive a reference image. The algorithms that are used can therefore be less complex and processing power is saved.

A further advantage is that there are effective algorithms for updating the orthogonal base when new lighting conditions are detected.

In an advantageous embodiment, the set of images comprises an image in which all the pixels have the same intensity.

An image in which all the pixels have the same intensity, that is to say that all the pixels have the same grayscale value, can be called a constant image. With a constant image, it is easy to capture variations where the whole scene is illuminated in the same way. Another advantage arises when intensity variations arise due, for example, to the exposure time being changed, as by using the constant image a monitoring unit can handle these settings automatically. This means that time-consuming manual settings are not required. A further advantage of using a constant image in comparison to, for example, calculating the intensity value of all the pixels with the same value, is that the calculation is quicker and easier.

According to a second aspect of the present invention, this relates to a monitoring unit for monitoring a monitored area, comprising a light-sensitive sensor which is arranged to record an image of the monitored area, and a central processing unit which is arranged to compare the recorded image with a reference image in order to determine whether there is an alarm situation, the central processing unit being further arranged to create a reference image by combining at least two previously stored images from a set of images, so that the lighting conditions in the reference image are adjusted to the lighting conditions in the recorded image.

The advantages of this monitoring unit are apparent from the discussion above.

According to third aspect of the present invention, this relates to a computer program for image processing when monitoring a monitored area, which computer program is stored on a computer-readable memory medium which comprises instructions for causing the computer to record an image of the monitored area and to compare the recorded image with a reference image in order to determine whether there is an alarm situation, which causes the computer to create a reference image by combining at least two previously stored images from a set of images, so that the lighting conditions in the reference image are adjusted to the lighting conditions in the recorded image.

The advantages of the computer program are apparent from the discussion above. The program is primarily intended to be installed in a monitoring unit which monitors a monitored area.

BRIEF DESCRIPTION OF THE DRAWINGS

In the following, the invention will be described in greater detail with reference to the accompanying drawings, in which.

DESCRIPTION OF A PREFERRED EMBODIMENT

Figure 1:
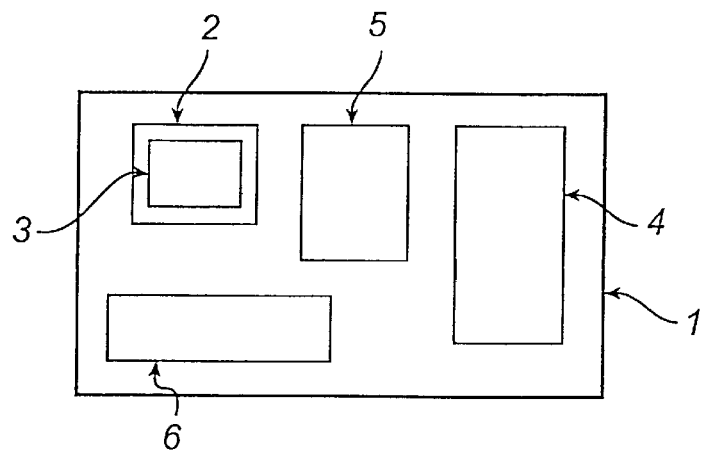
FIG. 1 shows schematically a block diagram of a monitoring unit according to the present invention.

FIG. 1 shows schematically a monitoring unit 1, which comprises a light-sensitive sensor 2 with an associated lens arrangement 3 which together are arranged to continuously record images of a monitored area. The monitored area can, for example, be premises in which people are not permitted. The monitoring unit 1 further comprises a central processing unit 4, which is arranged to process image information, a memory 5, in which previously recorded images can be stored, and a communication unit 6 for communication with an external unit. This communication can be carried out wirelessly. The external unit can, for example, be a central alarm center to which information is sent if an alarm situation arises, which in the example mentioned above would be if a person were to enter the monitored premises.

Figure 2:
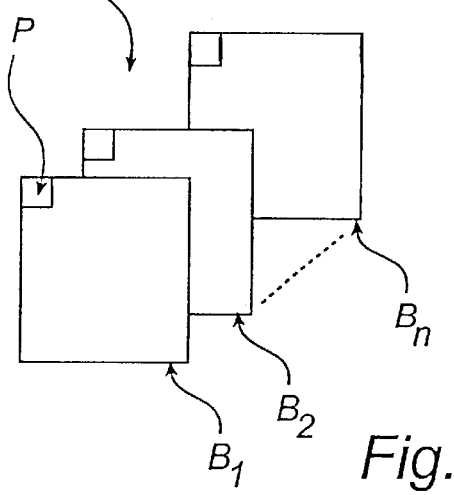
FIG. 2 shows a set of images according to the present invention.
Figure 3:
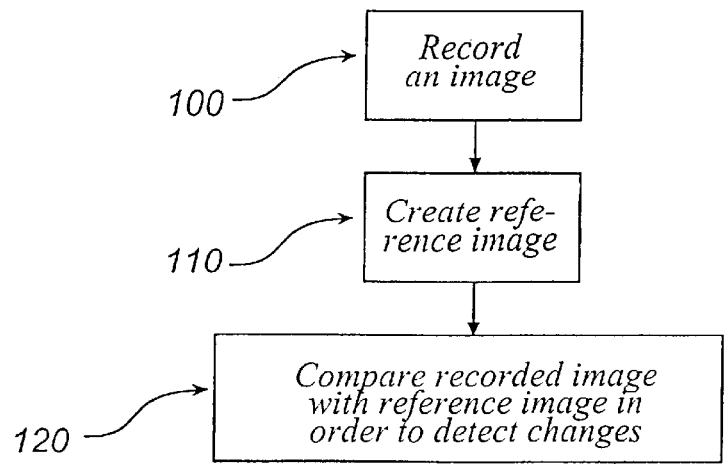
FIG. 3 is a flow chart showing a method according to the invention.
Figure 4:
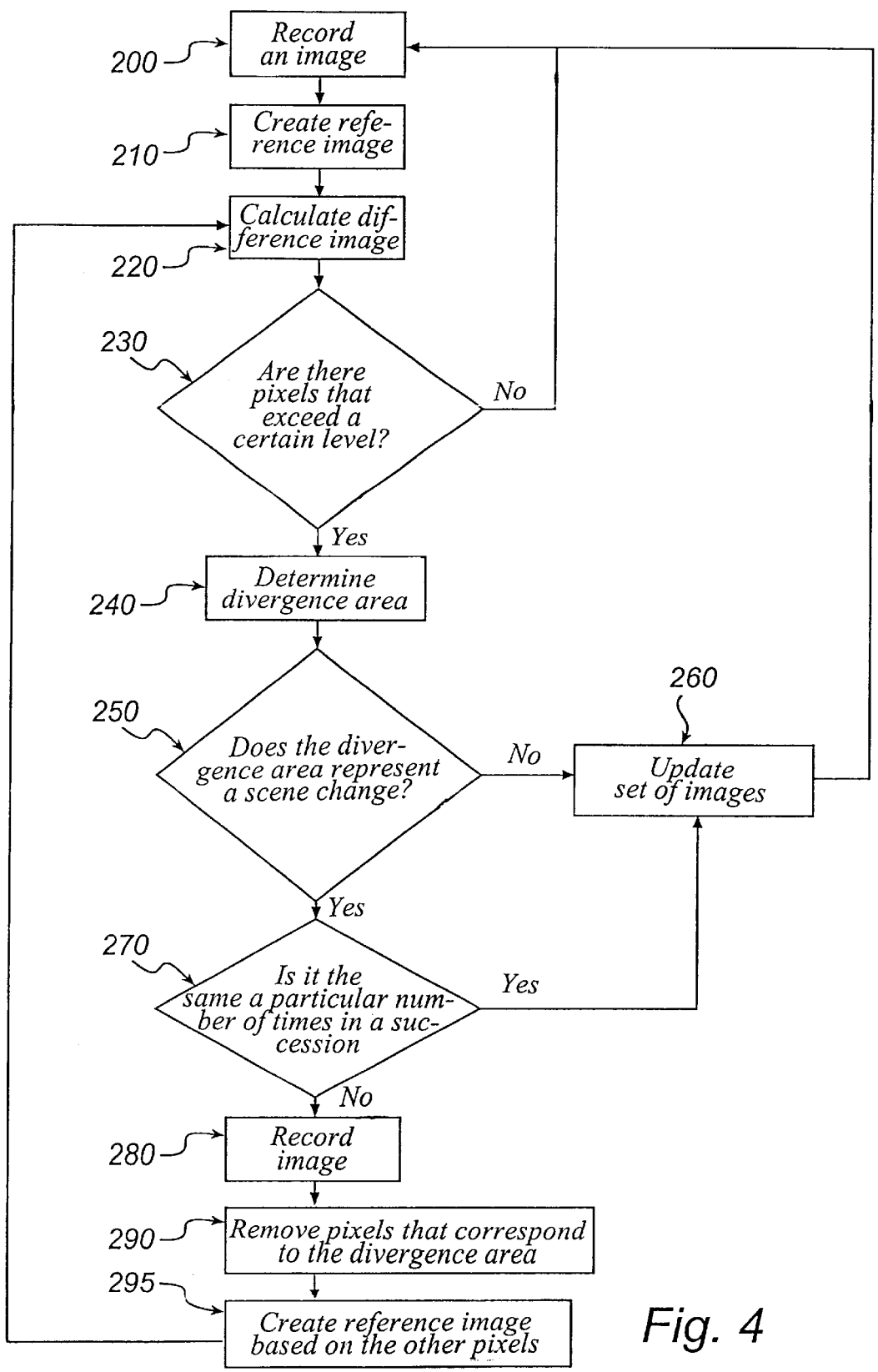
FIG. 4 is a flow chart showing an embodiment of a method according to the invention.

The present invention will now be explained further utilizing FIG. 2 and the two flow charts in FIGS. 3 and 4. A monitoring unit 1 can, for example, be placed in a corner of a room and be directed so that it can cover and monitor a specific monitored area.

The monitoring can be carried out as follows. The light-sensitive sensor records 100 an image of the monitored area. In order to detect an object that, for example, can be a person, in a recorded image, it is investigated whether there is any difference between the recorded image and a reference image which is a representation of the background of the monitored area. The reference image represents the monitored area when there is no object in the image that should not be there. In a simple embodiment, a reference image is created 110. This reference image is created by combining a number of previously recorded images $(B_1, B_2, \ldots, B_N)$ that are stored in a set of images U. The images are combined in such a way that they reproduce as well as possible the lighting conditions in the recorded image. The reference image is then compared 120 with the recorded image in order to detect whether there has been any change in the recorded image.

The set of images U can be created before the monitoring commences. For example, a sequence of images can be recorded for one minute. During this minute the light level is varied as much as possible. Each image is represented as a matrix with m x n elements, where the size of each element at position (i, j) corresponds to the recorded intensity of the point, usually called the pixel P. Normally, the intensity varies between 0 and 255, where 0 is black and 255 is white.

Each of these N images is then converted to a vector, for example by so-called stacking in rows, or by all the pixels being placed in a vector of length mn in some other way. For stacking in rows the first row is taken first, then the second is put after it and so on.

$$B_i = \begin{bmatrix} B_i^1 \\ B_i^2 \\ \vdots \\ B_i^n \end{bmatrix} \mapsto \hat{B}_i = (B_i^2, B_i^2, \ldots, B_i^n)$$

In the next step, a large matrix M is created out of all the images stacked in rows $\hat{B}_i$, i=1, ..., N, by placing them as columns in M $$M = [\hat{B}_1 \hat{B}_2 \ldots \hat{B}_N]$$

Finally, a so-called singular value division (SVD) of M is carried out, $$M = U\Sigma V^T$$

where U and V are orthogonal matrices and $\Sigma$ is a rectangular matrix consisting of zeros except at the locations (i,i) where the elements are called singular values. The columns in U describe the variation in the images $B_i$ and the corresponding singular value describes how large a weighting the column has in the description of all the lighting conditions. In addition, the singular values are arranged in order of size, with the largest first, which means that the first column in V describes the images best, then the second describes the variations from the first best, and so on. In order to determine how many images are to be included in the set of images, either the number can be fixed or a threshold can be put upon the singular values. For example, it can be when the corresponding singular value is 1/10 of the largest singular value. The set of images is then obtained by creating matrices of the columns in U in the same way as the columns were created out of the matrices. In this way, the set of images is obtained, $U_1, \ldots, U_b$. The orthogonal set obtained is not necessarily a representation of images that can be obtained from reality, but are synthetic images using which it is possible to recreate an original set of images.

The set of images is then updated gradually when the light-sensitive sensor 2 records new images which comprise light levels that are not represented in the set of images.

Images in the set of images can be stored with limited resolution. Normally it is sufficient to store one or a few images at full resolution, that is to say that each pixel is stored, and the other images at a considerably lower resolution, for example every second row and every second column are stored. This saves memory capacity.

In another embodiment according to the invention, there are a number of images in the set of images U that can reproduce a number of different lighting conditions. An image of a monitored area is recorded 200. The recorded image is called B. In order to create 210 a reference image, an algorithm is used which fits the reference image to the recorded image based on the set of images and which aims to find the linear combination of images in the set of images that conforms as well as possible to the light level in the recorded image. This is carried out by calculating coefficients $c_1, \ldots, c_b$ in such a way that $U = c_1 U_1 + \ldots + c_b U_b$ is an optimal reference image. The coefficients are selected by solving the optimization problem $$\min_{(c_i)} \|U - B\|_F = \min_{(c_i)} \sum_{j,k} (U(j,k) - B(j,k))^2$$

where $\|\ldots\|_F$ indicates the Frobenius norm. Other norms or more general functions can also be used. An advantage of using the Frobenius norm is that the coefficients can be calculated directly from the set of images by means of the formula:

$$c_i = (U_i, B) = \sum_{j,k} U_i(j,k) B(j,k)$$

where (,) indicates the normal scalar product.

When the reference image has been created, a difference image is calculated 220 as the absolute amount of the difference between the reference image and the recorded image. If there are pixels that exceed 230 a certain level and these pixels constitute a coherent area of a minimum size, a divergence area is determined 240. The divergence area consists of these pixels and pixels that abut these pixels. There can be several divergence areas in one and the same difference image. Each divergence area is investigated.

If a divergence area is determined, the variance of the difference image is calculated to determine in this way whether the divergence area represents a scene change or a lighting change 250. If the variance is large, the divergence area is judged to represent a scene change and if the variance is small, the divergence area is judged to represent a lighting change. There are also other techniques for evaluating what the divergence area represents. For example, NVD (normalized vector distance) can be used, which is described in "Matsuyama, Ohya, Habe: Background subtraction for non-stationary scene, Proceedings of the fourth Asian conference on computer vision, 2000", pages 662–667. A further technique comprises using quotients between intensities for adjacent pixels, which is described in U.S. Pat. No. 5,956,424.

If the divergence area represents a scene change and this scene change is detected in the same place in a number of consecutively recorded images 270, the scene change is judged to be persistent. For example, it can be a flower-pot that has fallen on the floor. Persistent scene changes are judged not to be critical. This persistent scene change is incorporated into the set of images by updating 260 the set of images. The updating can be such that a set of images is built up from scratch by discarding the old set of images, and using the recorded image to create a new set of images. The persistent scene change can also be incorporated gradually by, for example, storing the deviations separately in a separate set of images for only that part of the image. This can gradually be transferred to the set of images when all the lighting variations for the new object have been seen.

If a new scene change is detected, a new image of the monitored area is recorded 280. When the reference image is created, the pixels taken up by the divergence area in the recorded image are removed 290 and the reference image is created 295 from the other pixels. Assume that a scene change has been detected in the subset $I \subset B$ of the image. Following this, the optimization problem $$\min_{(c_i)} \|U - B\|_F(I) = \min_{(c_i)} \sum_{(j,k) \notin I} (U(j,k) - B(j,k))^2$$

is solved, where the deviations are minimized outside the detected area. A relatively good approximation can be obtained by calculating the coefficients by $$c_i = (U_i, B)_I = \sum_{(j,k) \notin I} U_i(j,k) B(j,k)$$

The smaller the subset I, the better the approximation.

The outermost rows and columns of the pixels can advantageously be removed when calculating the reference image, as a possible intruder first appears at the edge of the image and could thus possibly affect the reference image before detection has occurred.

Figure 5:
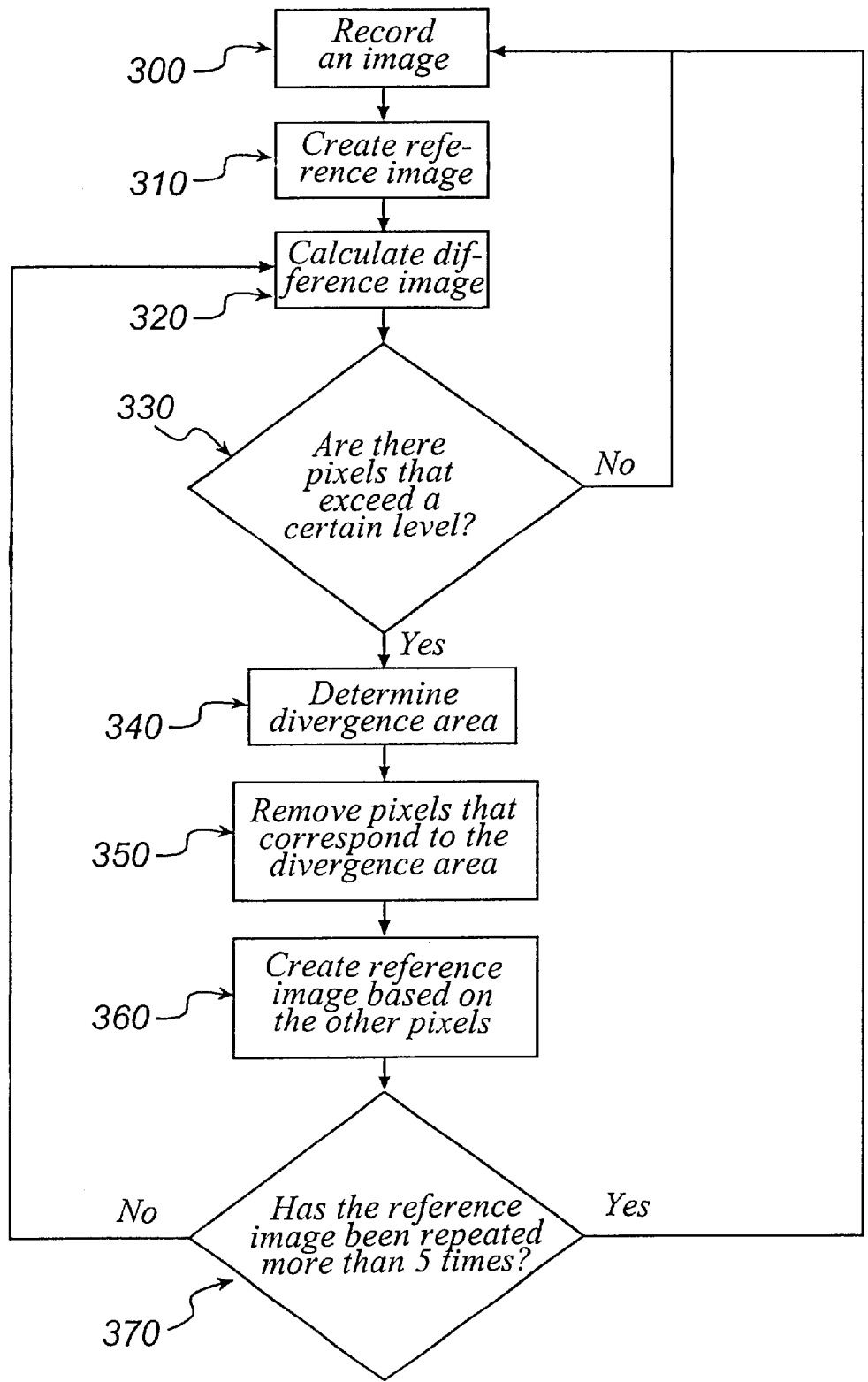
FIG. 5 is a flow chart showing an additional embodiment of a method according to the invention.

FIG. 5 shows a flow chart for a further embodiment according to the invention. An image of a monitored area is recorded 300. A reference image is created 310 in a way as mentioned above. When the reference image has been created, a difference image is calculated 320 as the absolute amount of the difference between the reference image and the recorded image. If there are pixels that exceed 330 a certain level and these pixels constitute a coherent area of a minimum size, a divergence area is determined 340. A new reference image is created in which the pixels taken up by the divergence area in the recorded image are removed 350 and the reference image is created 360 from the other pixels. The reference image is improved and refined by being repeated, for example, six times. If the reference image is not repeated 370 more than five times, a new difference image is calculated 320 and the process continues from there. When the image is repeated 370 more than five times, a new image of the monitored area is recorded 300 and a new reference image is created.

Even though a special embodiment of the invention has been described above, it will be obvious to a person skilled in the art that many alternatives, modifications and variations are possible in the light of the above description.

What I claim and desire to secure by Letters Patent is:

1. A method for monitoring a monitored area comprising:
    recording an image of the monitored area;
    comparing the recorded image with a reference image in order to determine whether there is an alarm situation,
    wherein the reference image is created by combining at least two previously stored images from a set of images, so that the lighting conditions in the reference image are adjusted to the lighting conditions in the recorded image;
    calculating a difference image as the difference between the reference image and the recorded image;
    determining at least one divergence area in the difference image, in which at least certain pixels exceed a particular level;
    determining whether the divergence area represents a scene change; and
    if the divergence area represents a scene change, removing the pixels that correspond to the divergence area in the recorded image for the creation of the next reference image.

2. A method according to claim 1, wherein the reference image is created by linear combination of said at least two previously stored images.

3. A method according to claim 1, further comprising:
    determining whether the divergence area represents a light change; and
    if the divergence area represents a light change, updating the set of images.

4. A method according to claim 1, further comprising:
    updating the set of images if the divergence area represents a scene change and if the same scene change is detected in a predetermined number of consecutively recorded images.

5. A method according to any one of claims 1, 3 or 4, wherein determining whether the divergence area represents a scene change comprises calculating the variance of the divergence area, and, if the variance exceeds a predetermined value, the divergence area is judged to represent a scene change.

6. A method according to claim 1, wherein at least the outermost edge of pixels in the recorded image are excluded when creating the reference image.

7. A method according to claim 1, wherein the stored images in the set of images are stored at different resolutions.

8. A method according to claim 1, further comprising:
creating the set of images by recording images of the monitored area under different lighting conditions; and
storing one or more of these recorded images.

9. A method according to any one of claim 3 or 4, wherein updating the set of images is carried out at predetermined intervals.

10. A method according to claim 1, wherein at least two images in the set of images are stored orthogonally.

11. A method according to claim 1, wherein the set of images comprises an image in which all the pixels have the same intensity.

12. A monitoring unit for monitoring a monitored area comprising:
a light-sensitive sensor which is arranged to record an image of the monitored area; and
a central processing unit which is arranged to compare the recorded image with a reference image in order to determine whether there is an alarm situation, wherein the central processing unit is further arranged to create the reference image by combining at least two previously stored images from a set of images, so that the lighting conditions in the reference image are adjusted to the lighting conditions in the recorded image,
calculate a difference image as the difference between the reference image and the recorded image;
determine at least one divergence area in the difference image, in which at least certain pixels exceed a particular level;
determine whether the divergence area represents a scene change; and
if the divergence area represents a scene change, remove the pixels that correspond to the divergence area in the recorded image for the creation of the next reference image.

13. A computer program for image processing for monitoring a monitored area, which computer program is stored on a computer-readable memory medium which comprises instructions, executed by a processor, to cause the computer to record an image of the monitored area;
compare the recorded image with a reference image in order to determine whether there is an alarm situation, wherein the reference image is created by combining at least two previously stored images from a set of images, so that the lighting conditions in the reference image are adjusted to the lighting conditions in the recorded image;
calculate a difference image as the difference between the reference image and the recorded image;
determine at least one divergence area in the difference image, in which at least certain pixels exceed a particular level;
determine whether the divergence area represents a scene change; and
if the divergence area represents a scene change, remove the pixels that correspond to the divergence area in the recorded image for the creation of the next reference image.

14. A computer program for image processing for monitoring a monitored area, which computer program is stored on a computer-readable memory medium which comprises instructions, executed by a processor, for carrying out one or more of the method steps according to claim 1.

15. A method for monitoring a monitored area comprising:
recording a first image of the monitored area;
comparing the first recorded image with a reference image in order to determine whether there is an alarm situation, wherein the reference image is created by combining at least two previously stored images from a set of images, so that the lighting conditions in the reference image are adjusted to the lighting conditions in the recorded image;
calculating a difference image as the difference between the reference image and the first recorded image;
determining at least one divergence area in the difference image, in which at least certain pixels exceed a particular level;
determining whether the divergence area represents a scene change; and
if the divergence area represents a scene change, recording a second image wherein the pixels that correspond to the divergence area in the second recorded image are removed and the remaining pixels of the second recorded image are used to create a next reference image.

16. A monitoring unit for monitoring a monitored area comprising:
a light sensitive sensor which is arranged to record a first image of the monitored area; and
a central processing unit which is arranged to compare the first recorded image with a reference image in order to determine whether there is an alarm situation, wherein the central processing unit is further arranged to create the reference image by combining at least two previously stored images from a set of images, so that the lighting conditions in the reference image are adjusted to the lighting conditions in the recorded image;
calculate a difference image as the difference between the reference image and the first recorded image;
determine at least one divergence area in the difference image, in which at least certain pixels exceed a particular level;
determine whether the divergence area represents a scene change; and
if the divergence area represents a scene change, record a second image wherein the pixels that correspond to the divergence area in the second recorded image are removed and the remaining pixels of the second recorded image are used to create a next reference image.

* * * * *